United States Patent Office.

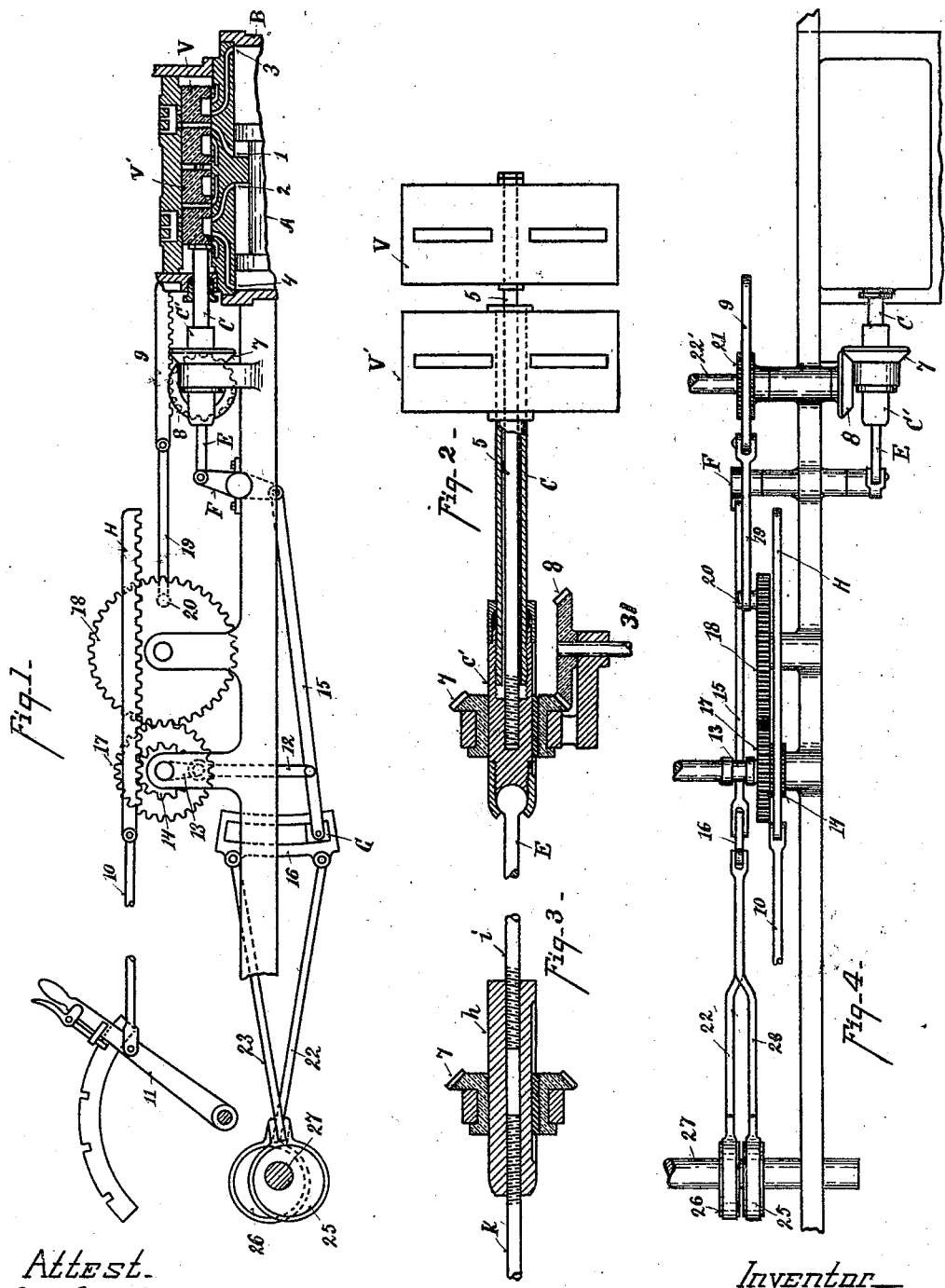

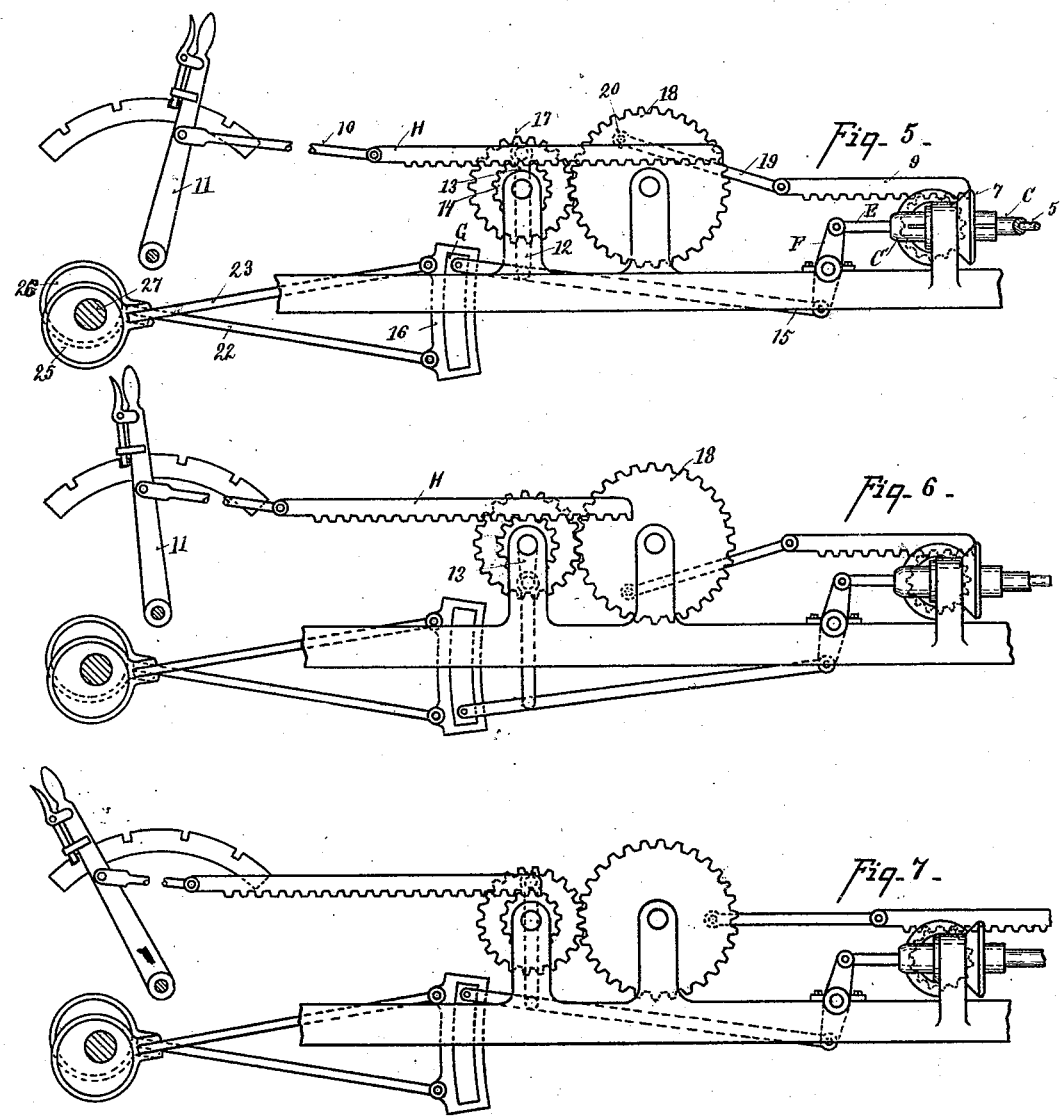

EDWARD W. HARDEN, OF CINCINNATI, OHIO, ASSIGNOR TO FREDERIC C. WEIR, OF SAME PLACE.

VALVE MECHANISM FOR COMPOUND ENGINES.

SPECIFICATION forming part of Letters Patent No. 512,192, dated January 2, 1894.

Application filed April 20, 1893. Serial No. 471,123. (No model.)

*To all whom it may concern:*

Be it known that I, EDWARD W. HARDEN, a citizen of the United States, residing at Cincinnati, in the county of Hamilton and State of Ohio, have invented certain new and useful Improvements in Valve-Setting Mechanism for Compound-Engines, of which the following is a specification.

My invention relates to that class of compound engines which employ one or more valves which are adjustable on their seat to convert a compound or triple expansion into a direct engine, and vice versa.

The various features of my invention are fully set forth in the description of the accompanying drawings making a part of this specification, in which—

Figure 1 is a side elevation of my improvement shown attached to a locomotive reversing link. Fig. 2 is a top plan view of the valve with the setting gear shown in section. Fig. 3 is a similar section showing a modification. Fig. 4 is a top plan view of Fig. 1. Fig. 5 is a diagram illustrating the position of the parts when the engine is working forward direct. Fig. 6 is a similar diagram of the valve gear with the engine reversed for working direct. Fig. 7 is a diagram illustrating the position of the parts shown in Fig. 1, with the engine working reversed compound.

I have shown my valve setting gear in Figs. 1, 4, 5, 6 and 7, as attached to the reversing links of a locomotive and operated by the reversing lever; the connections are so made that when the engine is working compound it can be reversed or it can be changed into a direct acting engine, and then reversed. The same gear is adapted to be used in a stationary engine and operated by a lever or ordinary hand wheel.

In the accompanying drawings A represents the piston of an engine. B the cylinder.

1, 2, represent ports for supplying live steam to the smaller area piston, and 3 and 4 represent the ports for supplying steam on to the larger area pistons.

In Figs. 1 and 2 I have shown a duplex valve V V' with mechanism for spreading apart and bringing the valves together for changing the engine from a compound to a direct and vice versa; and when this style of valve is employed I provide the following mechanism:

5 represents a valve stem securing valve V to the sleeve C' through the sleeve C. Sleeve C serves as a valve rod for valve V' and is rigidly attached to the valve V'. The valve stem 5 passes through the center of valve V' and is attached to valve V; this stem is screw-threaded into the sleeve C' for adjustment. Sleeve C is likewise screw-threaded into sleeve C' and reversely threaded to that of the valve stem 5. Sleeve C' journals in the bearing 6 and is provided with the bevel gear 7.

8 represents a bevel gear transmitting motion to bevel 7 for turning the sleeve C' and drawing the valve V' forward or backward, and at the same time moving the valve V in a reverse direction by the threads of the valve stem 5; by this means the valves V V' are spread apart on their seat or drawn together. In the position shown in Fig. 1 they are adjusted together for compounding. Thus ports 1 and 2 are supplying steam alternately to the smaller area pistons and ports 3 and 4 are alternately supplying steam from the smaller area cylinder into the larger cylinders for compounding. When, however, a single valve is employed which is adjusted forward and backward on its seat simply for the purpose of converting a compound into a direct, and vice versa, I provide the mechanism shown in Fig. 3.

*h* represents a sleeve operated by the gear 7.

*i*, *k*, represent a sectional valve stem with right and left threads engaging with similar threads cut in the sleeve *h*; whereby the revolving of the sleeve will draw together or spread apart the sectional valve stems *i*, *k*, and adjust the valve on its seat.

The following described instrumentalities are employed for operating the valve feed in either of its adjusted positions.

E represents the connecting rod operating the valve and pivoted to the crank arm F.

15 represents a connecting rod attached to the slide block G sliding in link 16.

12 represents a connecting rod pivoted to connecting rod 15 and to the crank 13 at the opposite end; said crank is mounted on the shaft of pinion 14.

H represents a rack bar meshing with the teeth of pinion 14 and operated by connecting rod 10 hinged to the setting lever 11.

17 represents a gear on the same shaft as the crank 13 and pinion 14 transmitting motion to gear 18.

19 represents a connecting rod hinged at one end to crank 20 of gear 18, and at the opposite end to the rack 9 which engages with the teeth of gear 21 on the shaft 22' transmitting motion to the bevel gear 8, thence to bevel gear 7, which drives the sleeve C'.

22, 23, represent eccentric rods and 25, 26, eccentrics on the shaft 27. It will thus be seen that the setting lever 11 is moved to accomplish two purposes; first, to convert the engine from a compound to a direct, or vice versa; and second, to reverse the engine whether working as direct or compound. These different movements are illustrated in Figs. 1, 5, 6 and 7. Fig. 1 shows the position of the parts when the engine is worked, say, forward compound; Fig. 5 represents the position of the parts when the engine is worked forward direct; Fig. 6 represents the position for working backward, direct; and Fig. 7 shows the engine working compound backward, which is the reverse direction to that illustrated in Fig. 1.

Mode of operation: The operator, therefore, attains either one of these motions by the position of the setting lever 11; thus, if when the engine is worked forward compound and he wishes to work it direct, he simply moves the lever back one notch in the position shown in Fig. 5. This movement pulls rack bar 19 backward, turns the pinion 14, crank 13, link 12, and raises the reverse link 15 and block G, the upper portion of link 16; this will ordinarily reverse the engine, but if this does not occur as the pinion 18 has been turned backward by pinion 17 moving link 19, rack bar 9 transmitting motion to sleeve C' and spreading the valves apart which would reverse the engine if link 12 had not been lifted in the reversing slot. Now if the lever be moved back in the third notch, as shown in Fig. 6, the connecting rod 19 occupies the same relative position to the rack 9 as shown in Fig. 5, but the reversing link 15 has been lowered which shifts the eccentric and reverses the engine, which works as a direct backward. If when the setting lever is in the position shown in Fig. 1, it is desired to reverse the engine while working compound, the setting lever is moved back in position shown in Fig. 7, and the engine is reversed still working as compound.

Having described my invention, what I claim is—

1. In combination with the valves V V', of a compound engine, the valve setting mechanism consisting of gear 7, 8, sleeves C C', and valve rod 5 connected up substantially as herein described.

2. In combination with the setting lever 11, eccentrics, links, and reversing mechanism of a locomotive, the valves V, V', and the valve setting mechanism consisting of racks, pinions, connecting rods, connected up to the setting lever 11, whereby the engine may be used as a compound or direct, and reversed at the pleasure of the operator by the movement of the setting lever, substantially as specified.

In testimony whereof I have hereunto set my hand.

EDWARD W. HARDEN.

Witnesses:
T. SIMMONS,
C. W. MILES.